H. A. STILSON.
DEVICE FOR SUPPORTING WHEEL TIRES.
APPLICATION FILED SEPT. 23, 1918.
1,311,578.
Patented July 29, 1919.
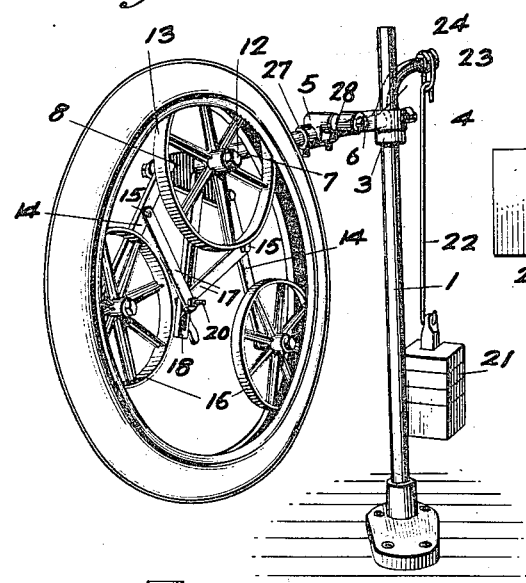
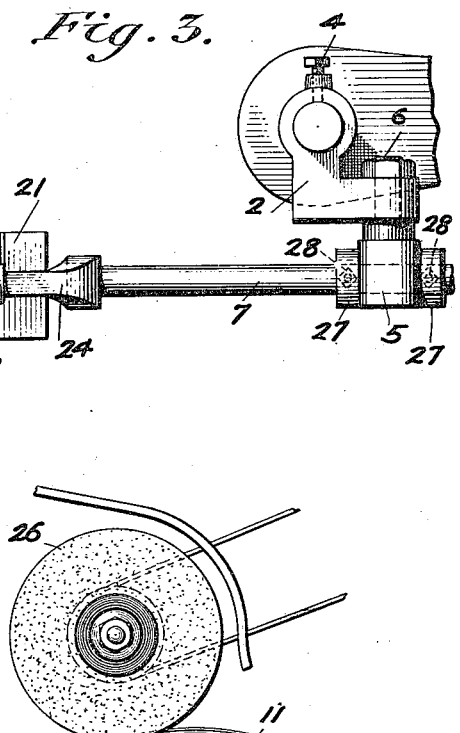
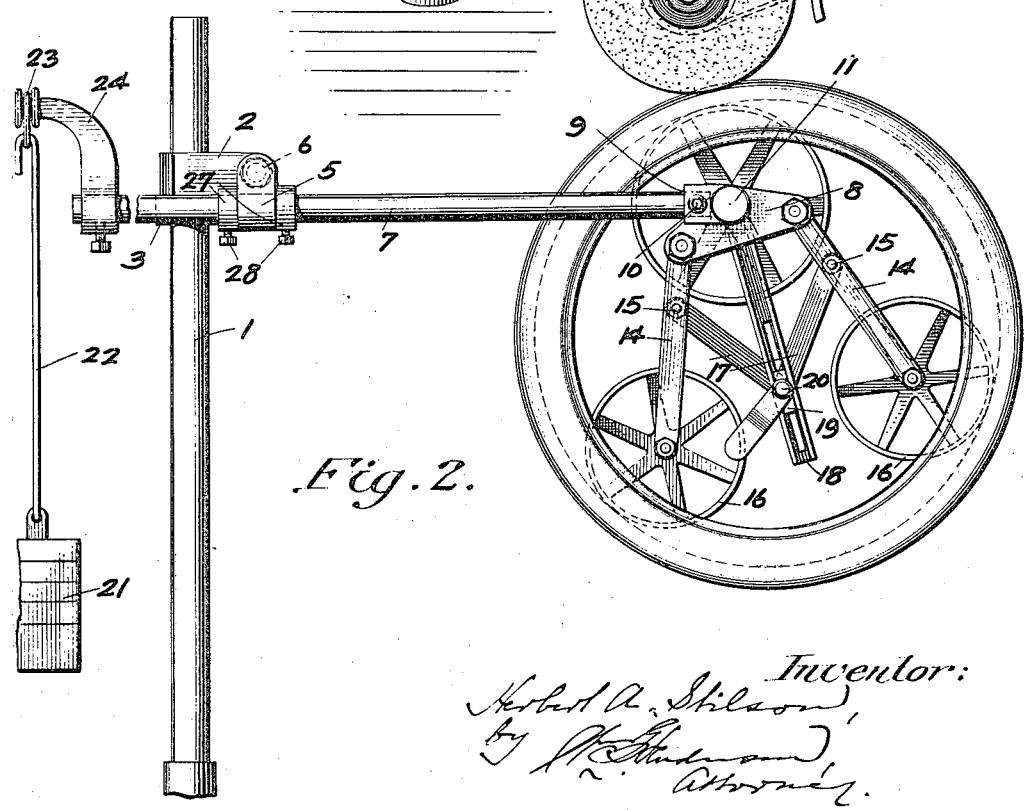
Inventor:
Herbert A. Stilson

UNITED STATES PATENT OFFICE.

HERBERT A. STILSON, OF DUBUQUE, IOWA, ASSIGNOR TO HENRY F. TRENK, OF DUBUQUE, IOWA.

DEVICE FOR SUPPORTING WHEEL-TIRES.

1,311,578.  Specification of Letters Patent.  Patented July 29, 1919.

Application filed September 23, 1918. Serial No. 255,405.

*To all whom it may concern:*

Be it known that I, HERBERT A. STILSON, a citizen of the United States, residing at Dubuque, in the county of Dubuque and State of Iowa, have invented certain new and useful Improvements in Devices for Supporting Wheel-Tires; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a device for supporting pneumatic tires while grinding off old rubber preparatory to resoling the tire. It has for its object to provide a device such as mentioned in which the tire will be rotatably supported so as to be conveniently rotated and presented at various angles to the grinding tool and the tire held in a distended or non-collapsible position while being manipulated with relation to the grinding tool. It comprises generally a spider-like tire holding member sustaining revolving wheels or members designed to fit within the hollow or concave portion of the tire so as to hold the same distended or non-collapsible while the tire is acted on by the grinding tool and while the tire is rotated or shifted to present succeeding areas of the tire surface to the grinding tool. The spider-like holder is supported so as to have a universal joint-like movement or swivel action which makes it possible to present the tire at different angles to the grinding tool and thus enabling the tool to act on one side or the other of the tire as well as on the portion between the two sides. The spider-like holder is also capable of a back and forth movement toward and from the operator so that it may be adjusted or brought within the range or zone of action of the grinding tool; and it is also counterweighted or balanced so as to permit of its manipulation with ease and expedition. The spider-like holder is also capable of adjustment in its parts so as to fit it to tires of different diameters. The foregoing indicate the general objects in view, and to the accomplishment of the same and other objects as may be made hereinafter to appear, the invention consists in the features of construction and in the combination of elements hereinafter particularly described and then sought to be clearly defined by the claims, reference being had to the accompanying drawings forming part hereof, and in which Figure 1 is a perspective view of the device showing a tire in position for grinding;

Fig. 2 is a side elevation with portions broken away showing the manner of using the device; and Fig. 3 is a top plan view of the counterbalancing mechanism and means for adjusting the tire supporting mechanism with relation to the grinding tool.

In the drawings the numeral 1 designates a standard of any approved type to which is attached a bracket arm 2 and which may rest upon a collar 3 encircling the standard and be held in place by a set screw 4, or otherwise. To the arm 2 a sleeve 5 is connected by a bolt or pin 6 passing through the arm so as to turn therein to enable the sleeve 5 to swing in a vertical plane. Through the sleeve 5 passes a rod or shaft 7 which is capable of sliding and also turning in the sleeve. To one end of the shaft 7 is suitably connected a bracket 8, for instance by a socket 9 to receive the end of the shaft and a set screw 10 to hold the bracket to the shaft. The bracket is formed with a journal bearing 11 to receive the axle-pin 12 of a wheel 13. The bracket also has two bars 14 pivotally connected thereto by bolts 15 and in the free ends of these bars are suitably journaled the wheels 16, and the bars 14 are held apart in their adjusted positions by spreading links 17 pivotally connected at one end to the bars, respectively, and at their other ends adjustably secured to a hanger arm 18 connected at one end to the bracket 8. The hanger arm 18 is slotted longitudinally so as to receive a sliding block 19 and a lock-bolt 20 which also passes through the two links 17 so to hold the links 17 and the wheel sustaining bars 14 in their adjusted positions. For the purpose of counter-balancing the wheels 13 and 16 and their associated parts, a counter-balancing weight 21 is suspended by a hook 22 or otherwise from the shaft 7, the connection between the suspending hook and shaft preferably being made by a ring 23 which may slip on the end of a bracket 24 secured by a set screw to the shaft 7, as shown, so as to shift the counter-balance or change the leverage as the work may require.

The wheels 15 and 16 and their supporting frame constitute a spider-like support for the shoe-tire 25 whose worn surface is to be ground off preparatory to resurfacing or resoling. Wheels 13 and 16 enter the concave interior of the tire and support the tire at different points so as to prevent it from collapsing while being subject to the action of the grinding tool illustrated diagrammatically at 26. The wheels afford a rolling support for the tire and permit it to be easily shifted on its support by the operator so as to present new surfaces to the grinding tool. The sleeve which supports the shaft by a pivotal connection from the standard permits the roller support and tire thereon to be swung up or down so that the tire may bear with more or less pressure against the grinding tool and thus have the grinding operation regulated. The adaptation of the shaft to slide in its sleeve support enables the operator to adjust the roller-support and its sustained tire back and forth in relation to the grinding tool, and the adaptation of the shaft to turn in its sleeve makes it possible for the operator to present the work at different angles and in different positions relatively to the tool so that either side of the tire or the desired portion between the sides may be presented to the grinding tool. Otherwise stated a swiveled movement of a universal joint character may be given to the work by manipulation of the roller support by the operator. The spreading apart of the wheels makes it possible to readily adjust the roller supports or wheels so as to fit tires of different diameters, and the counter-balancing of the work and its support make the manipulation of the parts easy and quick in presenting various portions of the work to the grinding tool.

The rod 7 may be held to its longitudinal adjustment in sleeve 5 by collars 27 held to the shaft by set screws 28.

I have illustrated and described the preferred details for the various parts of the device but changes can be made therein and essential features of the invention retained.

Having described my invention and set forth its merits, what I claim is:

1. A device for supporting wheel tires, comprising a frame provided with revoluble supports arranged to fit within the interior of a tire for sustaining the tire, and a support with which the frame has a swiveled connection.

2. A device for supporting wheel tires, comprising a collapsible and expansible frame provided with members disposed to engage the interior of a tire and maintain the tire distended, and a support with which the frame has a swiveled connection.

3. A device for supporting wheel tires, comprising a collapsible and expansible frame provided with members disposed to engage the interior of a tire and maintain the tire distended, a support with which the frame has a swiveled connection, and a counter-balance for the frame.

4. A device for supporting wheel tires, comprising a frame including pivoted arms carrying members disposed to engage the interior of a tire to maintain the tire distended, spreaders connected with said arms, means for securing the spreaders to adjusted positions, and a support with which the frame has a swiveled connection.

5. A device for supporting wheel tires, comprising a frame provided with members to engage the interior of a tire to maintain the tire distended, a support for the frame, and means between the frame and support permitting the frame to swing in a vertical plane and to be shifted angularly to present the tire at different angles to a grinding tool.

6. A device for supporting wheel tires, comprising a bracket having pivoted arms provided with members to engage the interior of a tire to maintain the same distended, means for securing the arms at various adjustments, a shaft supporting said bracket, a standard, and a pivotal member supported from the standard, said shaft being supported by said member and rotatable therein.

7. A device for supporting wheel tires, comprising a bracket having pivoted arms provided with members to engage the interior of a tire to maintain the tire distended, means for securing the arms at various adjustments, a shaft supporting said bracket, a standard, and a pivotal member supported from the standard, said shaft being supported by said member and slidable and rotatable therein.

In testimony whereof I affix my signature in presence of two witnesses.

HERBERT A. STILSON.

Witnesses:
A. E. SCHEPPELE,
VERONICA A. BRANT.